United States Patent [19]

Peters

[11] Patent Number: 5,050,105
[45] Date of Patent: Sep. 17, 1991

[54] DIRECT CURSOR-CONTROLLED ACCESS TO MULTIPLE APPLICATION PROGRAMS AND DATA

[75] Inventor: Anthony M. Peters, Bedford, Tex.

[73] Assignee: International Business Machines Corporation, Armonk, N.Y.

[21] Appl. No.: 148,730

[22] Filed: Jan. 26, 1988

[51] Int. Cl.⁵ .......................... G06F 3/14; G09G 1/00
[52] U.S. Cl. .................................. 364/521; 364/900; 340/721; 340/734
[58] Field of Search .............. 340/750, 754, 721, 723, 340/734; 358/903; 364/300, 518, 521, 200 MS File, 900 MS File

[56] References Cited

U.S. PATENT DOCUMENTS

| | | | |
|---|---|---|---|
| 4,435,777 | 3/1984 | McCaskill et al. | 340/750 |
| 4,555,775 | 11/1985 | Pike | 364/900 |
| 4,556,954 | 12/1985 | Aduani et al. | 364/900 |
| 4,586,158 | 4/1986 | Brandle | 364/900 |
| 4,811,240 | 3/1989 | Ballou et al. | 364/518 |

OTHER PUBLICATIONS

Microsoft Windows User's Guide—Version 2.0, 1987, pp. 83-84.

Primary Examiner—Gary V. Harkcom
Assistant Examiner—Raymond J. Bayerl
Attorney, Agent, or Firm—Whitham & Marhoefer

[57] ABSTRACT

A method for navigating between and within application programs resident in a computer system provides easy access to the programs and data within the programs. Two or more windows may be optionally linked together in an arbitrary sequence to form a chain. A user may invoke a function resident in the computer system to directly access windows in the chain in a sequence determined by the order in which the user opens the windows in a given session. The method for traversing between windows in the chain involves a uniform, short procedure dependent on positioning of a pointing cursor within an active window and, for example, pressing a mouse button. Further access to data within any application program is available by following a procedure which, although slightly different from that used to navigate between programs, is still uniform and short when compared with that normally used to traverse application programs.

9 Claims, 13 Drawing Sheets

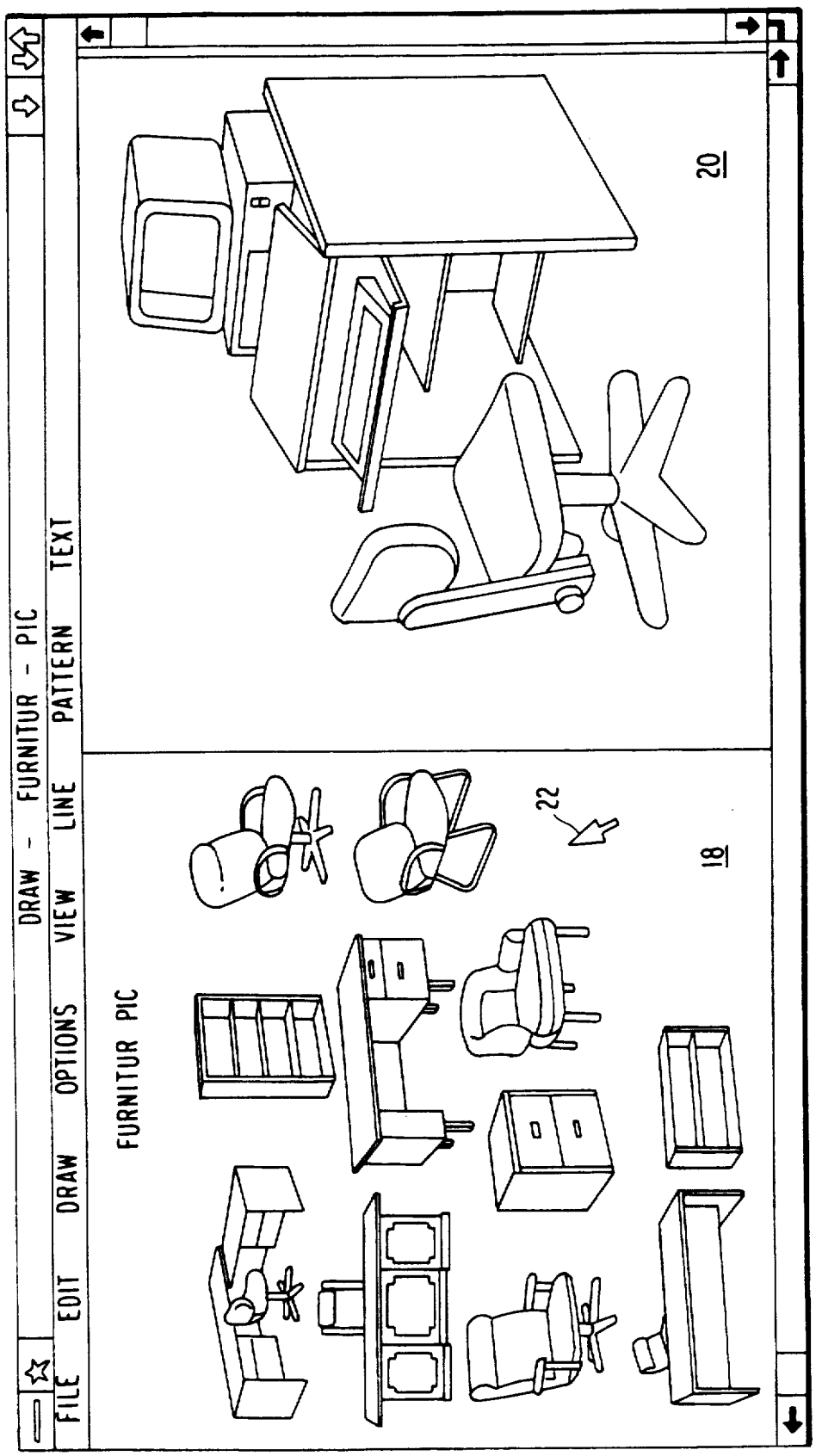

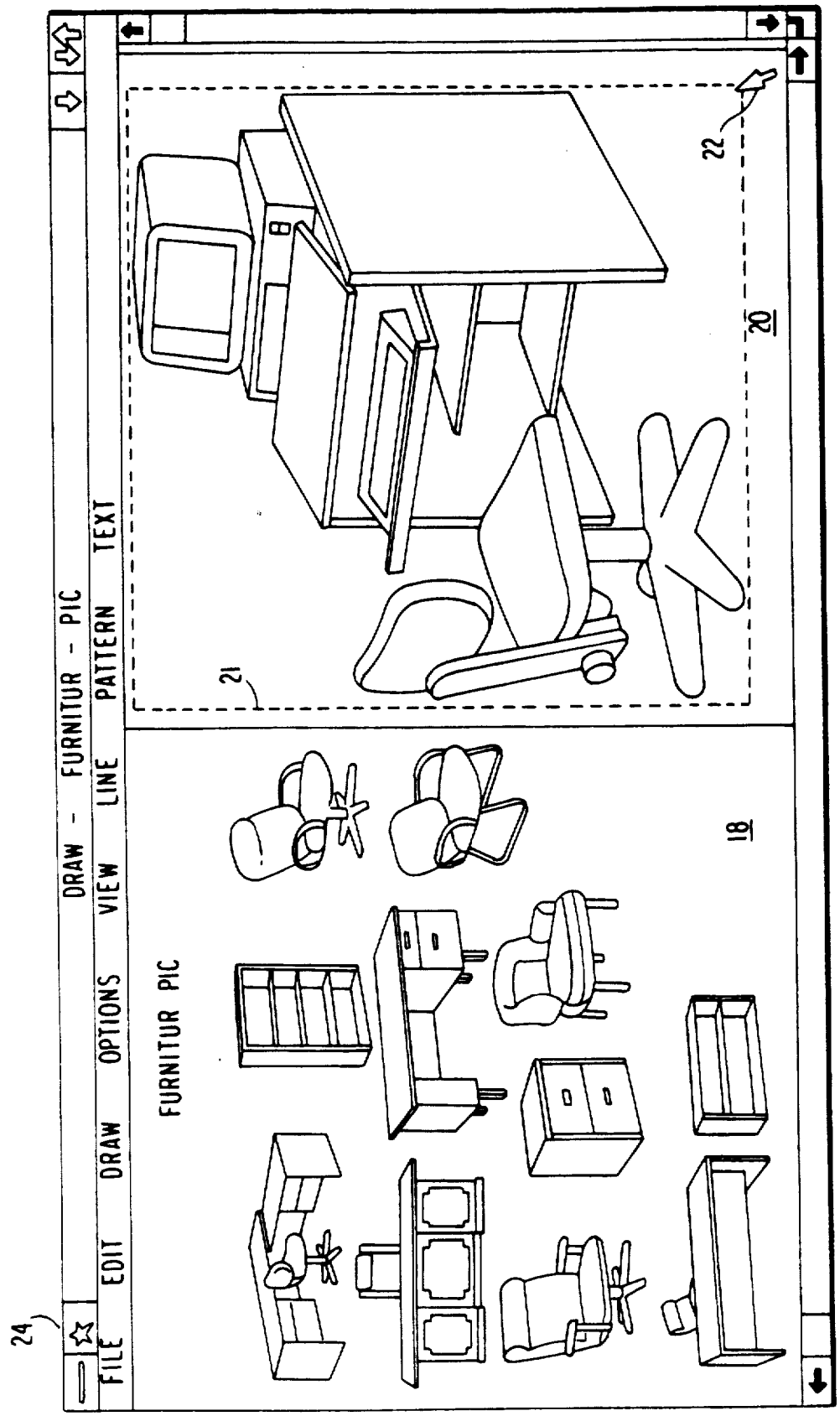

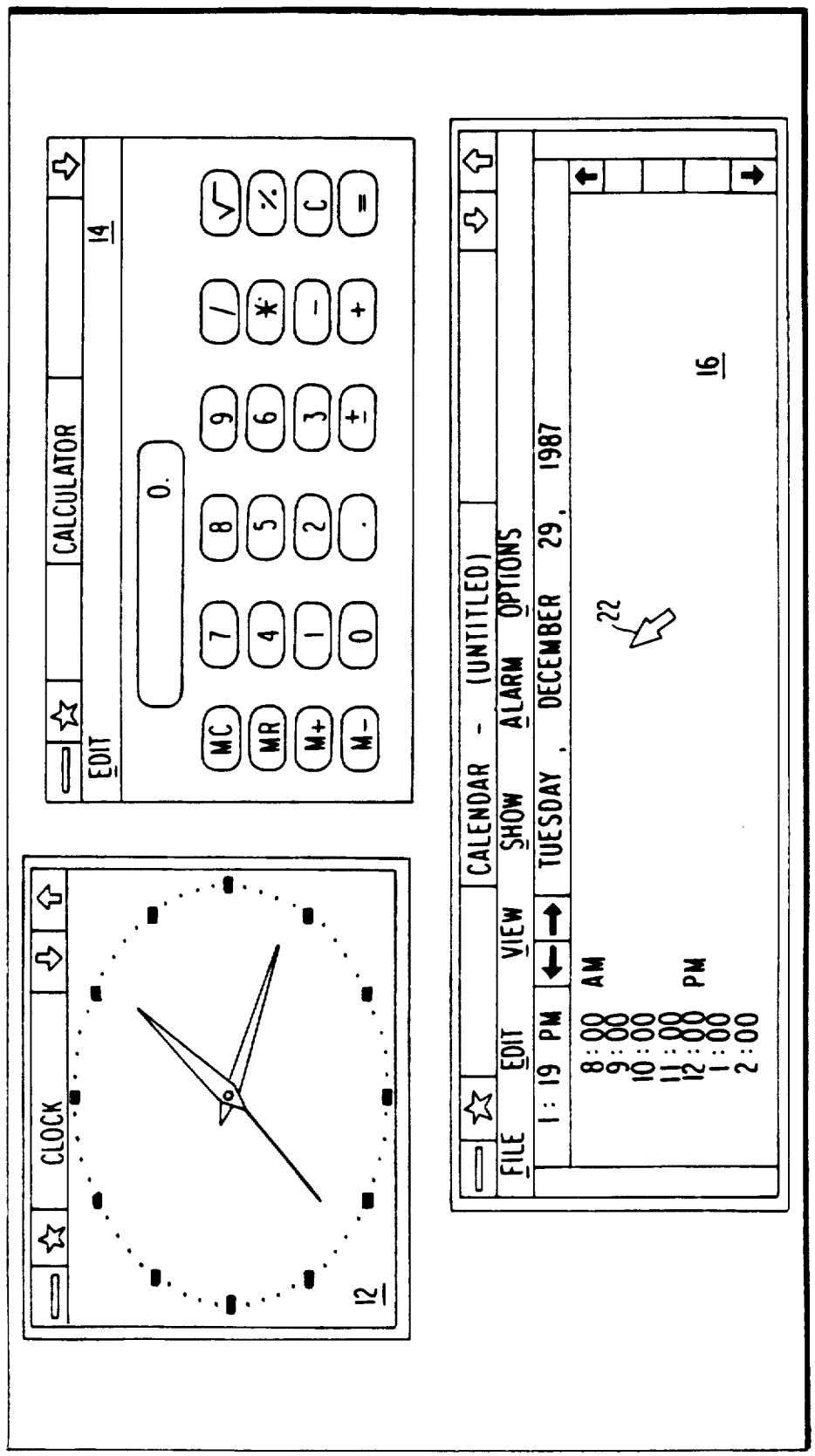

FIG. 6

```
| FILE  EDIT  SEARCH  CHARACTER  PARAGRAPH  DOCUMENT |
```

WRITE - ECSAMPLE - WRI

SMITH & SMITH, FURNITURE DEALERS
12345 146th Ave. S., Nashville, TN 37211

NEW OFFICE STYLES:

WE HAVE INTRODUCED A NEW STYLE OF DESK FURNITURE TO ALLOW YOU TO MAKE THE MOST OF YOUR COMPUTING EQUIPMENT. YOU CAN UNDERSTAND THAT SUCH OFFICE FURNITURE GIVES YOUR EMPLOYEES A COMFORTABLE AND PRODUCTIVE WORK SETTING. SHOWN BELOW IS A PICTURE OF ONE OF OUR OFFERINGS:

10

PLEASE CALL US IF YOU WOULD LIKE TO PURCHASE THIS DESK. WE WOULD BE MORE THAN HAPPY TO

PAGE 1

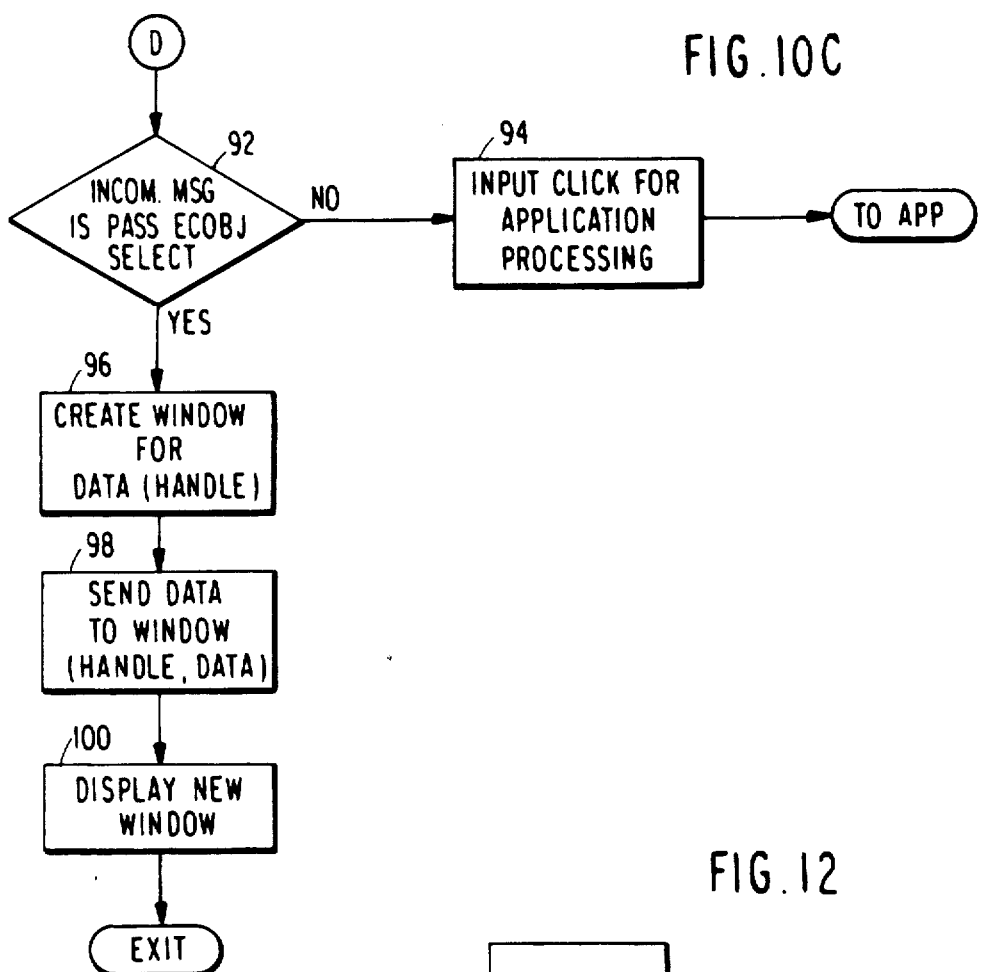

DIRECT CURSOR-CONTROLLED ACCESS TO MULTIPLE APPLICATION PROGRAMS AND DATA

BACKGROUND OF THE INVENTION

1. Field of the Invention

The subject invention generally relates to accessing computer application programs and data in a speedy and efficient and consistent manner and, more particularly, to providing users with a tool to assist them in navigating through a plurality of related or unrelated application programs in a multi-tasking environment with a minimum of keystrokes so as to display desired data on a computer display screen.

2. Description of the Prior Art

A relatively recent advance in the computer arts allows users to simultaneously access, display and manipulate data from a variety of related and/or unrelated computer application programs. This process is referred to as "multi-tasking". In a true multi-tasking system, several application programs are active simultaneously. Multi-tasking has been simulated on some of the less powerful personal computers in that only one application is in fact active at any one time, but the user interface presents the appearance of multi-tasking. Activity relating to each application is displayed in what is termed a "window". These windows can either overlap and, partially or completely, obscure each other or be presented in a visually discrete, i.e., nonoverlapping, manner. The user may at his own option work with data in any of the open windows by changing his active work area. Examples of windowing programs include Windows TM published by Microsoft Corp. and DesQview TM published by Quarterdeck Office Systems. Both of these windowing systems support the IBM Personal System 2 (PS/2) series of personal computers.

There are, however, certain inherent problems in most such windowing systems. In order to reach the data which he desires to manipulate, the user must often follow a different and sometimes complicated procedure for each application program and, within each program, at each level of data type, such as file, page or word, which he attempts to access. Consequently, the user faces a loss of time due to the number of keystrokes necessary simply to obtain a visual image of the ultimate object data and due to the time necessary for the system to respond to the different commands given it. Furthermore, the user's job is made even more difficult due to the necessity to remember a multiplicity of different interface and access procedures for different application programs and for different levels within the same application program. Finally, since many true multi-tasking systems allow access between any level of one active program to any level of another active program, such systems require an unusually large amount of resident memory in order to service such requests promptly and efficiently.

Certain application programs have attempted to solve these problems but have done so at the expense of various desirable features. For example, the HyperCard program of Apple Computer, discussed at length in *The Complete HyperCard Handbook*, by Danny Goodman, Bantam Books (1987), provides a simple means for avoiding a predetermined organizational scheme when accessing object data, allowing direct linking of various disparate types of data at the user's command via activation of a "button". Although this program provides a uniform, simple and relatively swift method of interfacing between different types of data which may be stored in completely different formats, it suffers from an inability to display more than one type of object data at a time on screen and from a requirement for an enormous amount of resident memory and static storage capacity to function properly. Moreover, this program is designed to be a toolkit enabling users to design their own permanent links between data, thereby creating new applications rather than a program for providing swift access to levels of data within other pre-existing application programs which are not otherwise interconnected.

Another approach is a utility program published by SoftLogic Solutions as SoftwareCarousel. This program permits up to ten different application programs or data files to be loaded and allows the user to move from one to the other with a single key stroke. The utility requires configuration by the user. It is not a multi-tasking system.

What is needed is a computer program which operates in a windowing environment and provides easy access to different levels of other application programs through a uniform, short procedure which does not require an inordinate amount of either computer resident memory or external storage space. The operation of the program should be user transparent requiring no configuration by the user.

SUMMARY OF THE INVENTION

It is therefore an object of the subject invention to provide a method for navigating between different application programs in a multi-tasking environment and between different levels of information within any single application program which is at the same time easy to use, speedy, accomplished with a sparse number of keystrokes or user movements and also sparing in its memory requirements.

According to the invention, a utility program is provided which allows the user to establish a linked order between levels of windows which may display and, through use of an optionally selectable function based on cursor positioning in a computer display window to access those windows and application programs at different levels directly using a short and uniform procedure. The user activates this function, termed an exploding cursor (EC) function, by toggling an icon which appears on the windows presented to the user. The icon presents a continuous indication while the computer system is active of whether the EC function is currently active. If the function is activated, the user may immediately either progress through a sequential display of the opening windows which may include of a chained group of application programs by positioning a cursor anywhere within a currently active window and, by simply pressing a button on a mouse, to cause the next window in the sequence to open and be displayed or he may create a new chain of windows or add new windows to a pre-existing chain of programs. In order to access data within any particular window in the chain, the user repositions the cursor over a document or file title, referred to as a passive object, and selects that title. Data within that document or file will then be displayed in a new window and may then be manipulated. After completing manipulation of data within an application program, the user may either exit the exploding cursor function or may return to the chain and access the next window therein. Regardless of the application program, the user may navigate between application programs using the same, uniform short procedure. Moreover, in order to access data within an application program, a similar uniform procedure is used. The invention provides additional flexibility to the user since he may either invoke the exploding cursor function or completely disregard it and access any application program or data directly without progressing through the chain of windows.

Conceptually, the invention may be considered to be a tool analogous to a pencil eraser or other implement used by a person to page or leaf through a pile of documents which have accumulated on their desk. Each document is like a separate window and the position of the document in the pile depends on when person placed it on their desk, just as the order in which a particular window appears in a sequence depends on when that window was opened. Confronted with this "messy desk", the person can easily see what document is on the top of the pile but may not remember just where in the pile another document may be. Taking the eraser end of a pencil or their finger, the person would page or leaf through the pile to find the document in question. Thus, using the exploding cursor function of this invention, the user can page or leaf through the windows in the order in which they are opened to easily find the window which they desire. The sequence is built internally in a data structure according to the order in which the windows are opened in a process that is entirely transparent to the user. Paging can be in either direction within in the sequence so that the user can page back to a later opened window after accessing an earlier opened window.

BRIEF DESCRIPTION OF THE DRAWINGS

The foregoing and other objects, aspects and advantages of the invention will be better understood from the following detailed description of the invention with reference to the drawings, in which:

FIG. 3 is a view of a computer display screen showing two windows in a third plane of a single graphics application program;

FIG. 4 is a view of a computer display screen similar to FIG. 3 showing a graphic marked for a cut and paste operation;

FIG. 5 is a view of a computer display screen similar to FIG. 2 illustrating the process of paging backward in the sequence of windows;

FIG. 6 is a view of a computer display screen similar to FIG. 1 illustrating the marked graphic object pasted in the document of the word processor application program;

FIGS. 10A, 10B and 10C, taken together, are a flow diagram showing the logic of the asynchronous hook monitor funciton called from the flow diagram shown in FIG. 9B, including display and application enabling logic;

FIG. 12 is a block diagram illustrating the generalized data structure of an exploding cursor object chain built by the process according to the invention.

DETAILED DESCRIPTION OF A PREFERRED EMBODIMENT OF THE INVENTION

Figure 1:
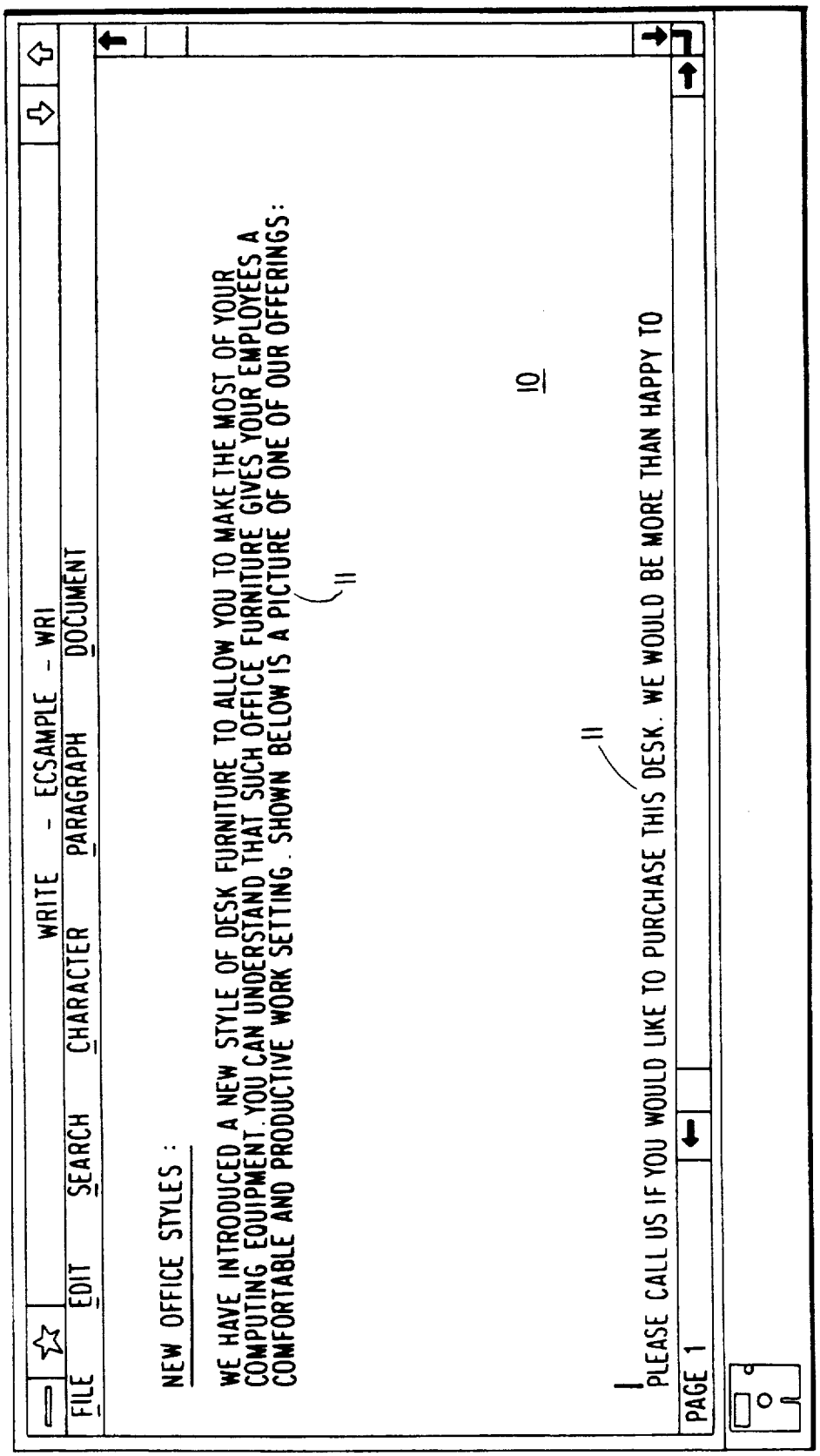
FIG. 1 illustrates a word processor window displayed on a computer display screen in a first plane.

The invention will first be described in terms of its user interface as simulated using a commercially available windowing program sold as Microsoft Windows TM. This program either simulates or actually supports multi-tasking, depending on the version and the computer on which it is installed. Reference is first made to FIG. 1 of the drawings. This figure illustrates a window 10 in which a computer word processing program is running. Within the window 10 is text 11 of a document being prepared by the user, and it will be observed that space has been left in the document for a graphic object.

Figure 2:
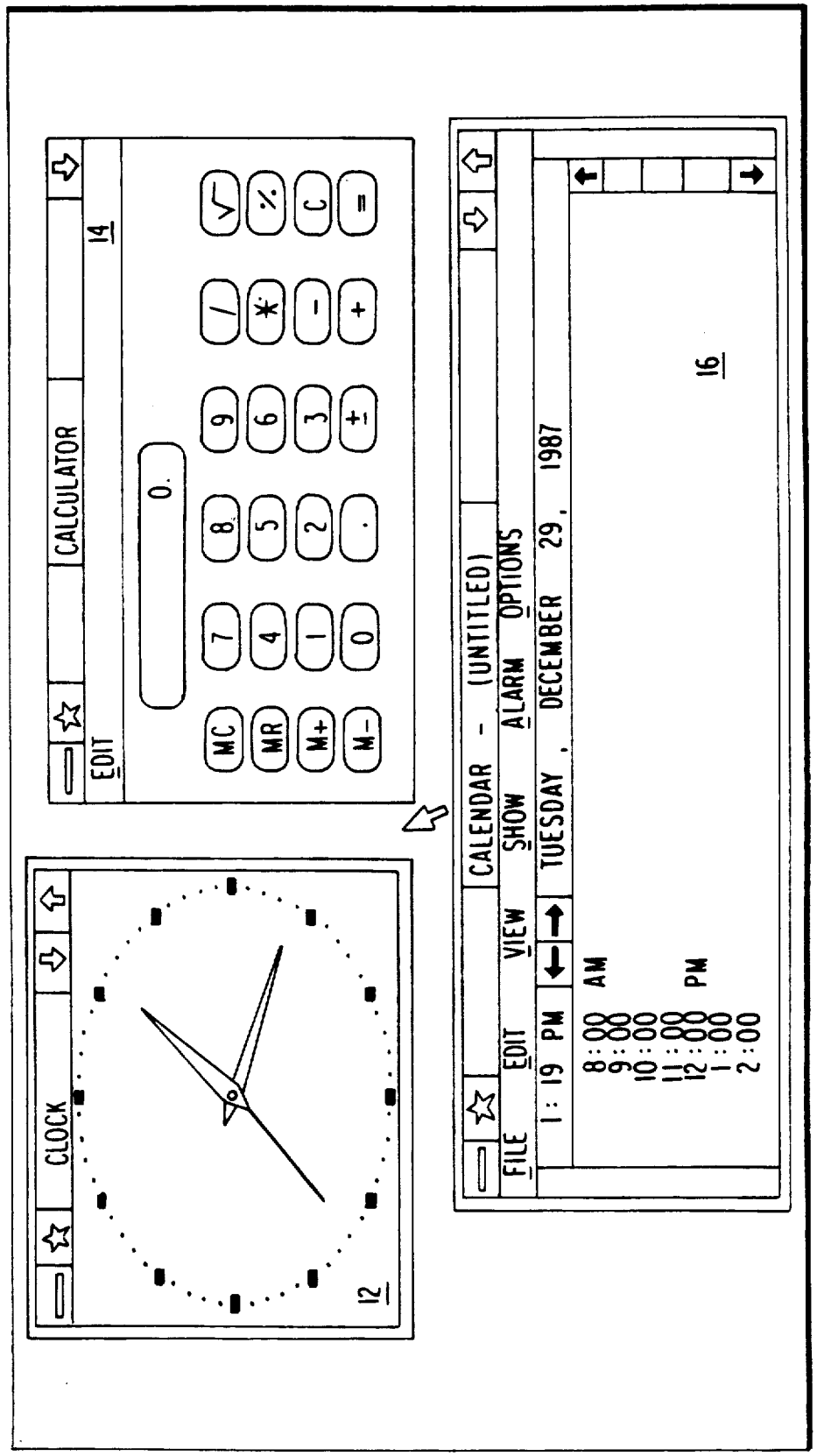
FIG. 2 is a view of a computer display screen showing three windows in a common plane, referred to in the description as the second plane.

For purposes of the illustrated example, it will be assumed that the user wants next to generate the graphic object which will be pasted into the document. To do this, a graphics application program will be used and this requires opening a window for that program and activating that program. But first, the user might, for example, consult a calendar, perhaps do some calculation or engage in some other miscellaneous tasks before going to the graphics program. The result might be as shown in FIG. 2 where three windows in a second plane have been opened. These three windows are a clock 12, a calculator 14 and a calendar 16. The three windows may be supported by a single application program or multiple application programs. The point of the illustration is to show plural windows on a single plane supporting diverse functions.

Now, when the user has finished with the windowed applications in display plane two, their attention now returns to the document being prepared, and to this end they open the graphics application program as illustrated in FIG. 3. In this particular application program, there are two windows 18 and 20, the first showing several graphic objects stored in a library of graphics objects and the second being for the generation of a drawing. In this program, the user can select predrawn graphic objects from the library shown in window 18 and, using a "drag" operation, import selected objects into the drawing space of window 20 using a pointing cursor 22, in the shape of an arrow. The cursor 22 is movable within the windows 18 and 20 by means of a pointing device, such as a mouse (not shown). Such pointing devices are well known in the art and form no part of the present invention. In addition, the user can draw in the drawing space of window 20, again using the pointing cursor 22 and with graphics primitives of the graphics editor, the finished drawing. As shown in FIG. 3, the finished drawing is a personal computer desk and chair which has been generated by a combination of stored drawings and draw functions.

FIG. 4 shows the same display as illustrated in FIG. 3 except that the finished drawing in window 20 has been marked by a dotted line 21 for a cut and paste operation. The marking operation is also done using the pointing cursor 22. Now, the user needs to return to the word processing application in order to paste the drawn graphic in the space provided in the document being prepared. At this point in time, the user may not remember where in the layers or planes of windows the word processing program is, but using the invention, the user does not need to remember. Moreover, the process for paging back to the word processor is greatly simplified.

According to one aspect of the invention, an icon, termed the exploding cursor (EC) icon 24, is displayed in the top or title bar of the window or windows displayed. The user can select this function by positioning the pointing cursor 22 on the EC icon 24 and clicking a button on the mouse. A mouse typically has one or more buttons which may be pressed by the user's index finger. When the EC is active, the icon 24 is bright, but when it is inactive, it is "grayed" or shaded to be less bright. The EC function is deactivated in the same manner that it is activated; i.e., by positioning the pointing cursor 22 on the EC icon 24 and clicking a button on the mouse. Thus, selection and deselection of the EC function is a toggling function. The user would typically select the EC function at the beginning of a session or at some other convenient point in the session.

Assuming the EC function is activated, the user simply places the pointing cursor 22 at any place in a currently displayed window and clicks a mouse button. From FIG. 4 this will result in the display which is shown in FIG. 5, which will be recongnized as the display of FIG. 2, that being the next preceding display. None of the windows in plane 2 are the word processing program, so the user simply places the pointing cursor 22 in the field of one of the windows 12, 14 or 16 and clicks the mouse button again. This results in the redisplay of the word processing window in the first plane shown in FIG. 1. At this point, the user can paste the graphic created and cut from window 20 of the graphics application program in plane 3. The result is shown in FIG. 6.

It should be understood that the various application programs, such as the word processor or the graphics application program, or for that matter the windowing program, form no part of the present invention. Also, the processes of selecting with a mouse controlled pointing cursor, cutting and pasting, and opening windows and activating the various application programs are conventional and form no part of the invention. What the invention accomplished in the illustrative example just given is to provide the user with a simple and easy to use procedure to navigate among application programs running in various windows on a multitasking system, either real or simulated. In order to accomplish this result, the system according to the invention must build a chain of what are called EC objects, or ECOBJs, in the order in which windows for each successive application program are opened by a user in a particular session. This is done totally transparent to the user, as will be described in more detail hereinafter.

Figure 7:
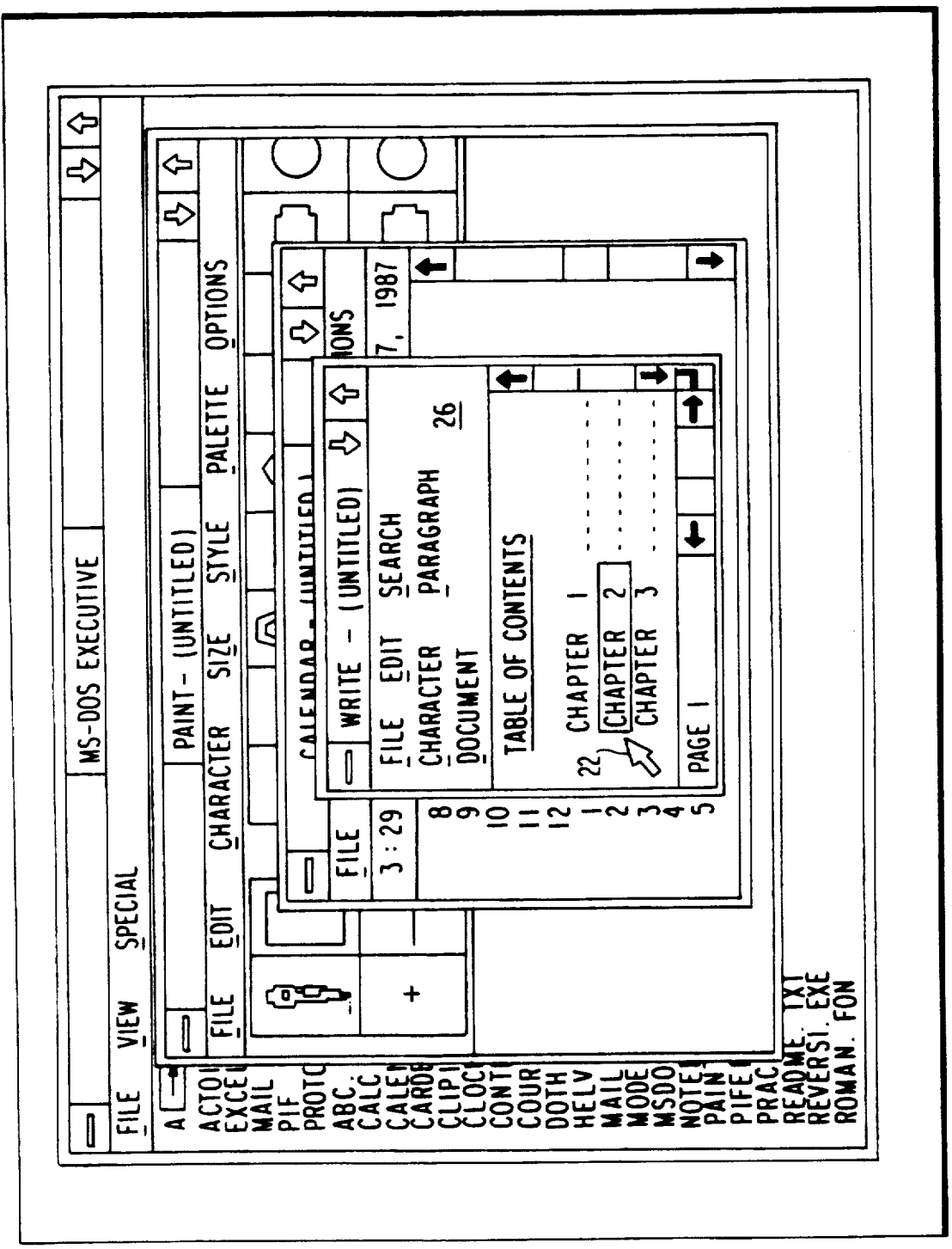
FIG. 7 is a view of a computer display screen showing a menu of documents which may be accessed within a word processing application program.
Figure 8:
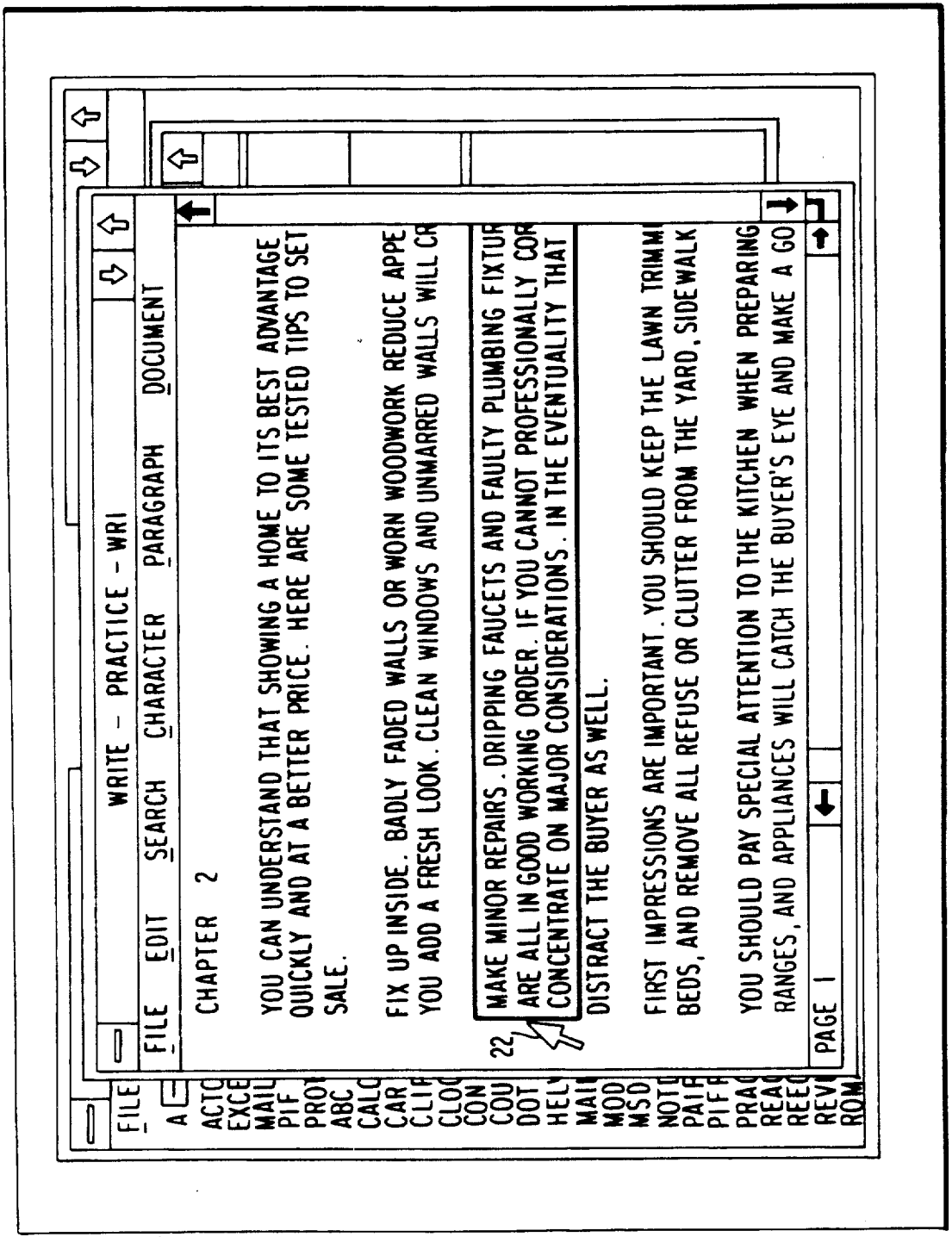
FIG. 8 is a view of a computer display screen showing a window with marked text from a document which has been accessed from the menu of FIG. 7.

Consider next another example to illustrate another aspect of the invention. In this example, a word processing program is activated to open the word processing window 26 in FIG. 7. FIG. 7 shows a plurality of overlapping windows, the topmost of which is a table of contents computer display screen. In contrast with navigation through the chain of application programs, when accessing or manipulating data within an application program, the user must revert to a procedure of positioning cursor 22 over a passive object and selecting the object by means such as a quick series of two clicks on the mouse button or by pressing a different, designated button on the mouse or the Enter key on the keyboard. For instance, in FIG. 7, the user has positioned cursor 22 over "Chapter 2" which is then shown highlighted by reverse video. After the object has been selected, a new window appears, as shown in FIG. 8, containing text data from "Chapter 2". Here, cursor 22 has been used to mark a selected portion of the text and the text which has been selected is displayed highlighted in reverse video.

It is important to note that in order to access each new application program or data, the user has had to follow a uniform and simple procedure which involved only placing cursor 22 within the currently active window and pressing a mouse button. This contrasts with a much more complicated and lengthy procedure which must be followed in other prior art systems to navigate between application programs and data within a program. In such systems, if a user wanted to access a sentence within a document, that user would have to traverse a progression of discrete operations through the various planes or layers to access the desired object. Note also that according to the invention, the user interface is made uniform and consistent for accessing data within an application as for accessing the application itself.

Figure 9A:
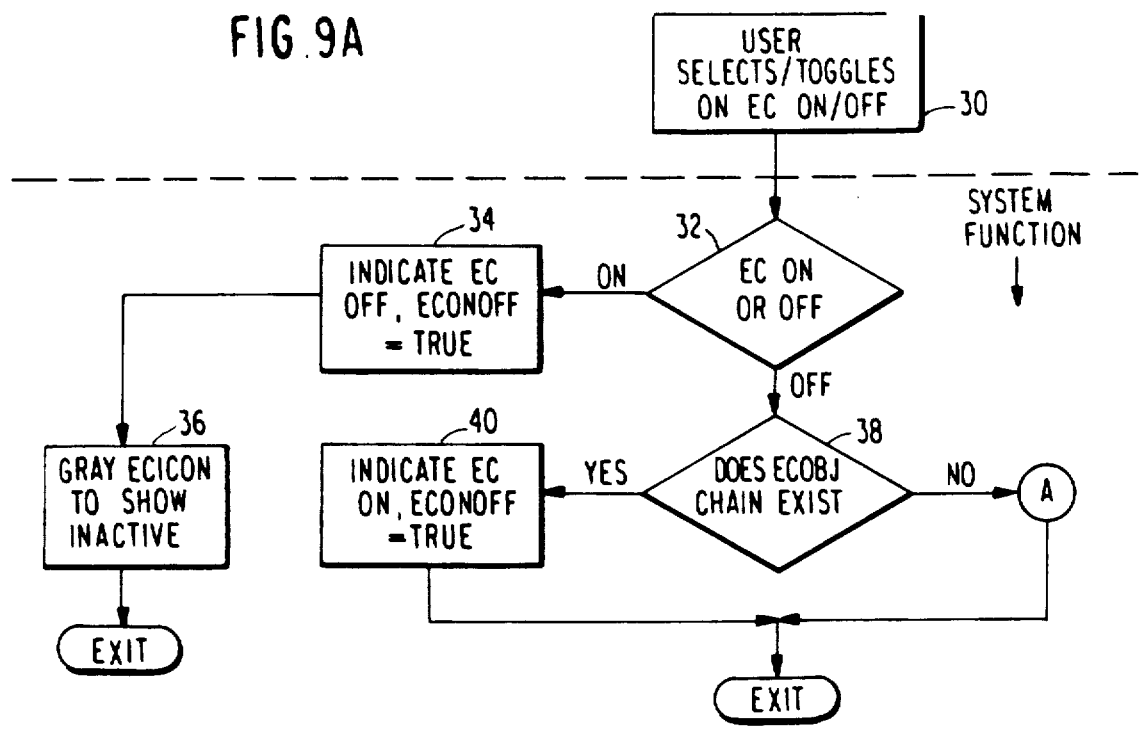
FIGS. 9A and 9B, taken together, are a flow diagram showing the logic and operation of the exploding cursor selection and initialization according to the invention.
Figure 9B:
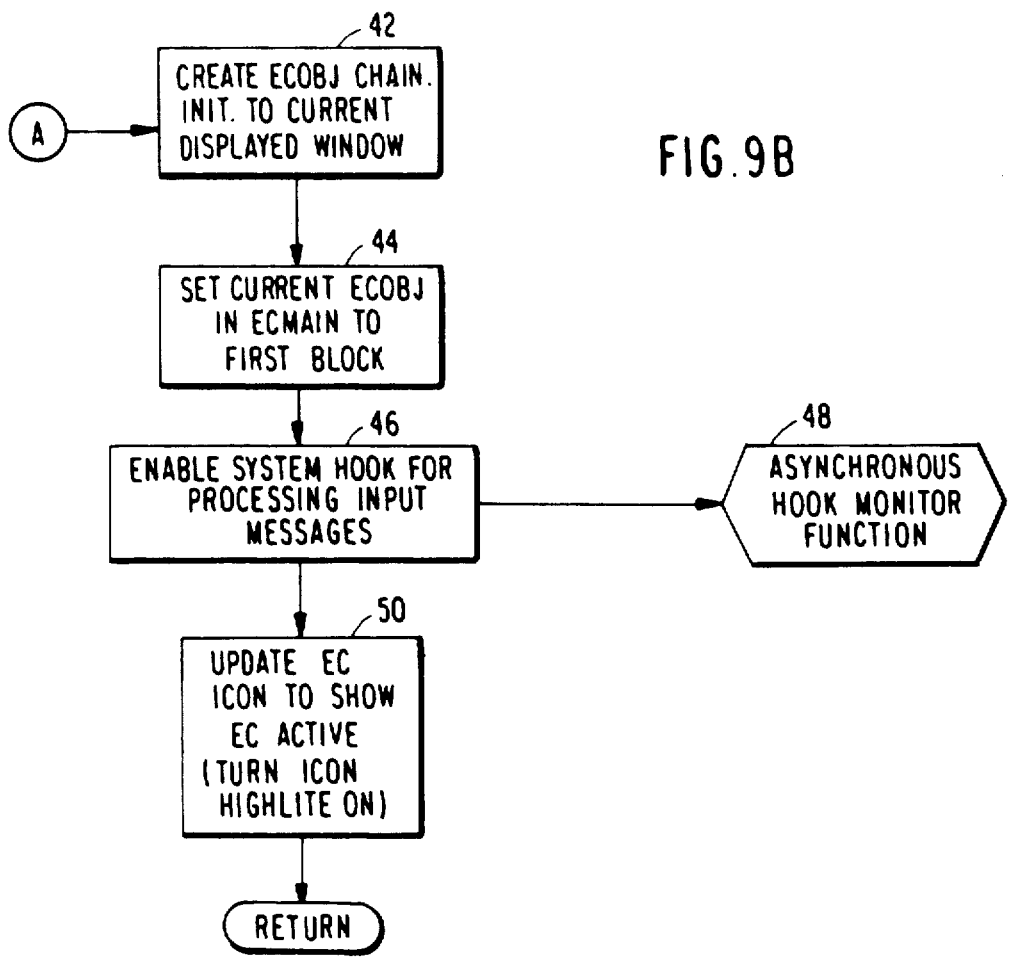

The flow diagram of FIGS. 9A and 9B illustrates the overall logic in an implementation of the invention. The flow diagram of these figures is complete and sufficiently detailed that a programmer of ordinary skill in the art can write source code, from which object code can be derived, in a computer language, such as BASIC, Pascal or C, which is supported by the computer system. The IBM PS/2 series of computers, for example, supports these and other computer programming languages.

The process begins in FIG. 9A when the user toggles the exploding cursor (EC) function on or off in function block 30. The system monitors the user input in decision block 32 and determines the desired state of the EC by comparing with its previous state. In other words, if the EC were on when the user toggles the function, it is turned off in function block 34 and the EC icon on the computer screen is grayed to show that it is inactive in function block 36 before the function is exited. On the other hand, if the EC were off, it is turned on and a test is made in decision block 38 to determine if an EC object chain exists. If it does, the EC icon is switched on indicating that the EC function is on, and the user can proceed to select application programs in the sequence of the EC object chain. On the other hand, if an EC object chain does not exist, control goes to that part of the flow diagram, shown in FIG. 9B, which creates an EC object chain as the user opens windows for different applications.

In FIG. 9B, the EC object chain is created by listing, in order, the application programs in the order in which they are activated. When the listing has been completed, the system is reinitialized, as indicated in function block 42. Next, the current EC object is set in the main window in function block 44. In function block 46, a system hook is enabled for processing input messages. This function is called by operation block 48 and is described in more detail with reference to FIGS. 10A to 10C. Finally, the EC icon is updated in function block 50 to show that the EC function is active before a return is made to the main program.

Figure 10A:
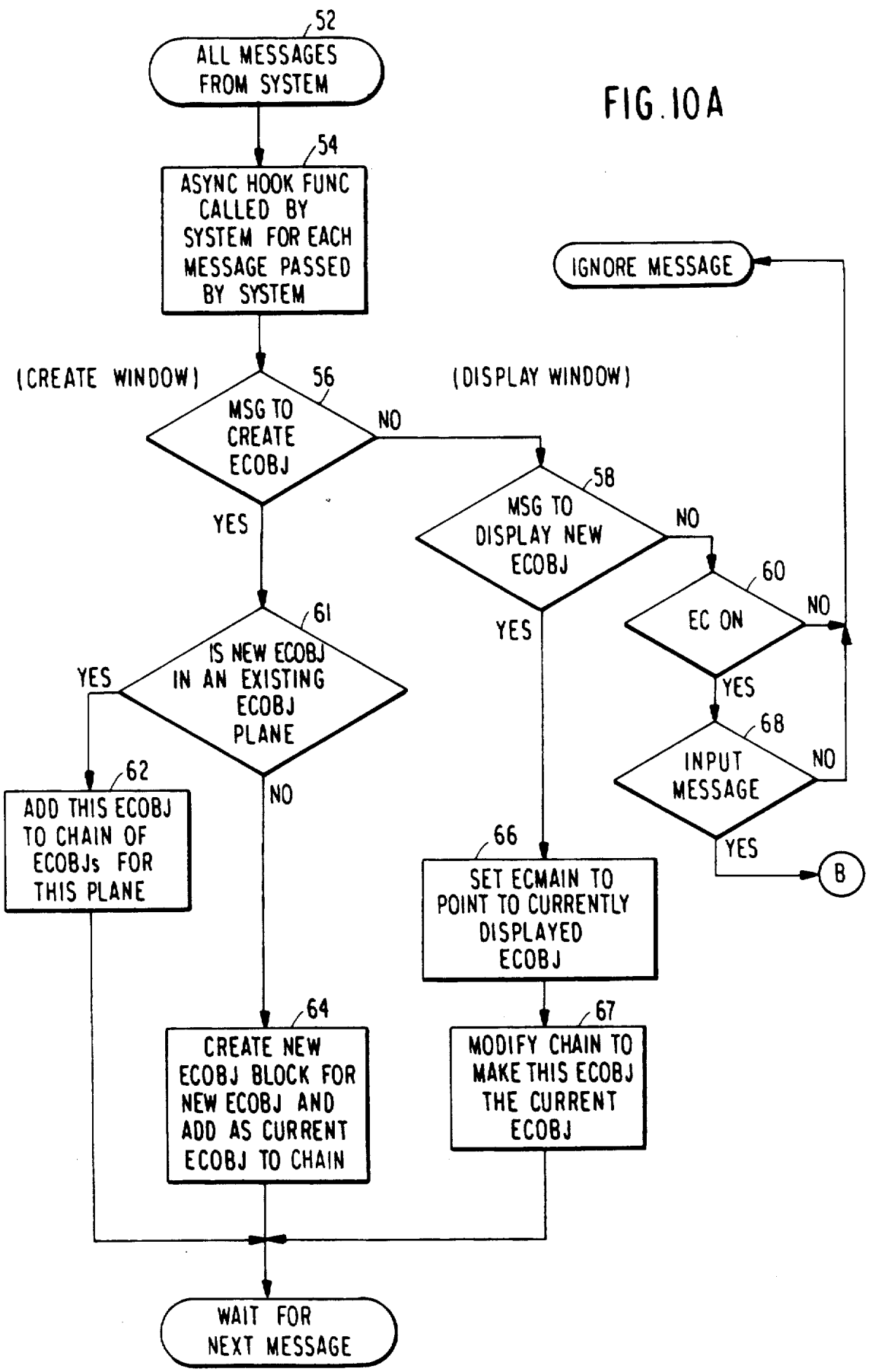
Figure 10B:
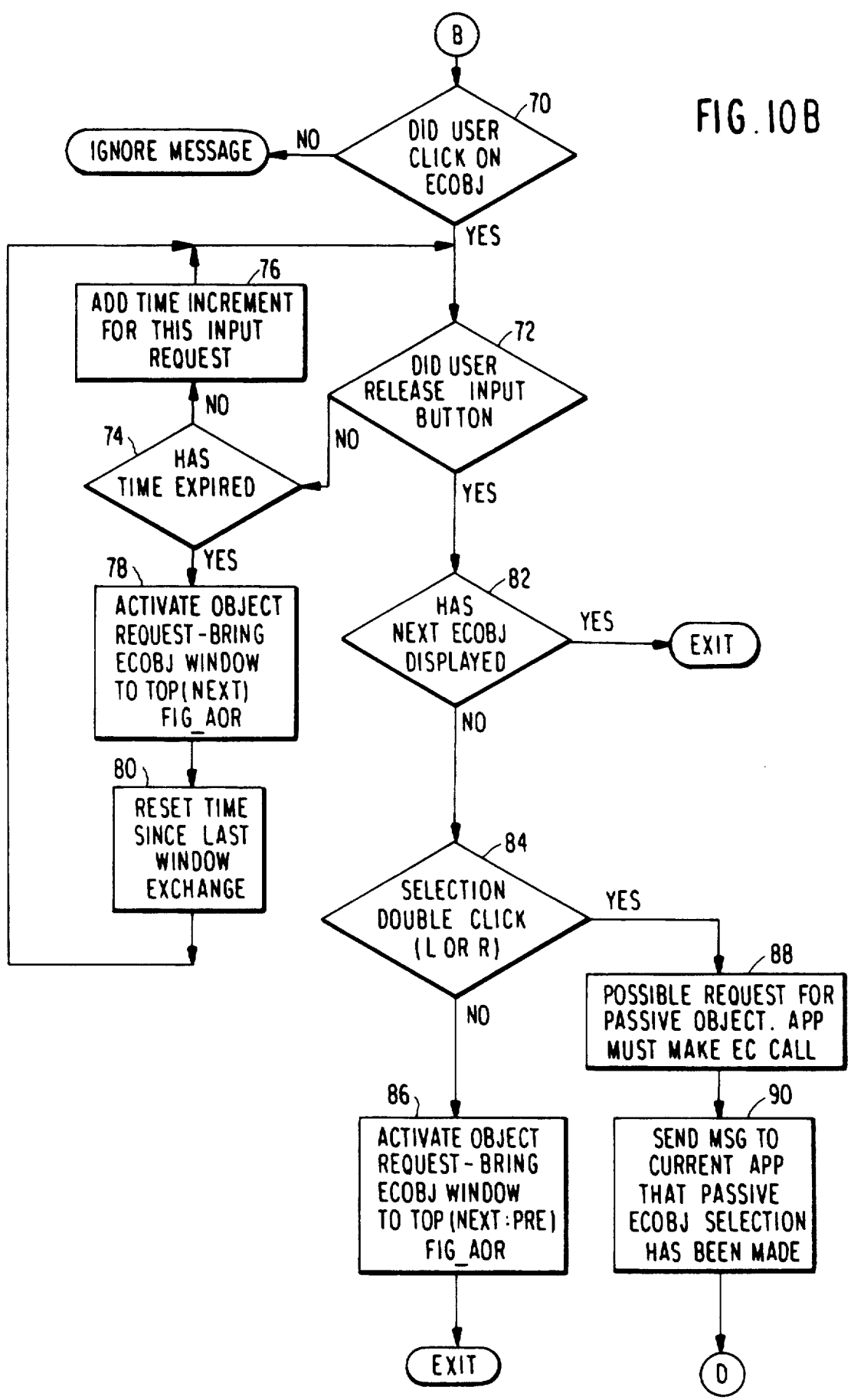

FIGS. 10A to 10C show the logic of the asynchronous hook monitor function. This function is started when the EC function is activated for the first time, and its purpose is to keep all windows in a chain if a hook is installed. When this function is called, all messages from the system, indicated by input 52, are routed to the asynchronous hook function called by the system in function block 54. For each message, a test is first made in decision block 56 to determine if the message is to create an EC object. If not, a test is next made in decision block 58 to determine if the message is to display a new EC object. If not, a test is made in decision block 60 to determine if the EC function is on. If it is not, the message is ignored. On the other hand, if the message is to create an EC object, then a test is made in decision block 61 to determine if the new ECOBJ is in an existing ECOBJ plane. If so, this ECOBJ is added to the chain of ECOBJs for the plane. Otherwise, a new EC object block is created in function block 64, and the system waits for the next message. If not a message to create an EC object but rather to display a new EC object, the ECMAIN is set to point to the currently displayed EC object in function block 66. Next, the chain is modified in function block 67 to make this ECOJB the current ECOBJ, and again the system waits for the next message. It should be observed that each time an ECOBJ (i.e., window) is brought to the top, the ECOBJ chain is adjusted by the system to make that ECOBJ the current ECOBJ on the ECOBJ chain. Note that an ECOBJ for display can be comprised of a plurality of ECOBJs (windows) in a single plane. This process, performed totally transparent to the user, may be thought of as a dynamic shuffling of ECOBJs.

If both tests in decision blocks 56 and 58 are negative but the EC function is on, a test is made in decision block 68 to determine whether the message is an input message. If not, the message is ignored; otherwise, control goes to FIG. 10B where a test is made in decision block 70 to determine if the user cliked on the EC object. If not, the message is ignored; otherwise, a test is made in decision block 72 to determine if the user has released the input button. If not, the system times the duration in decision block 74, and if the time has not expired, a time increment is added for this input request in function block 76 before control returns to decision block 72. On the other hand, if time has expired, the object request is activated in function block 78, and the EC object window for the top or next application program is opened. Then, in function block 80 the time is reset since the last window exchange, before control is returned to decision block 72.

Figure 11:
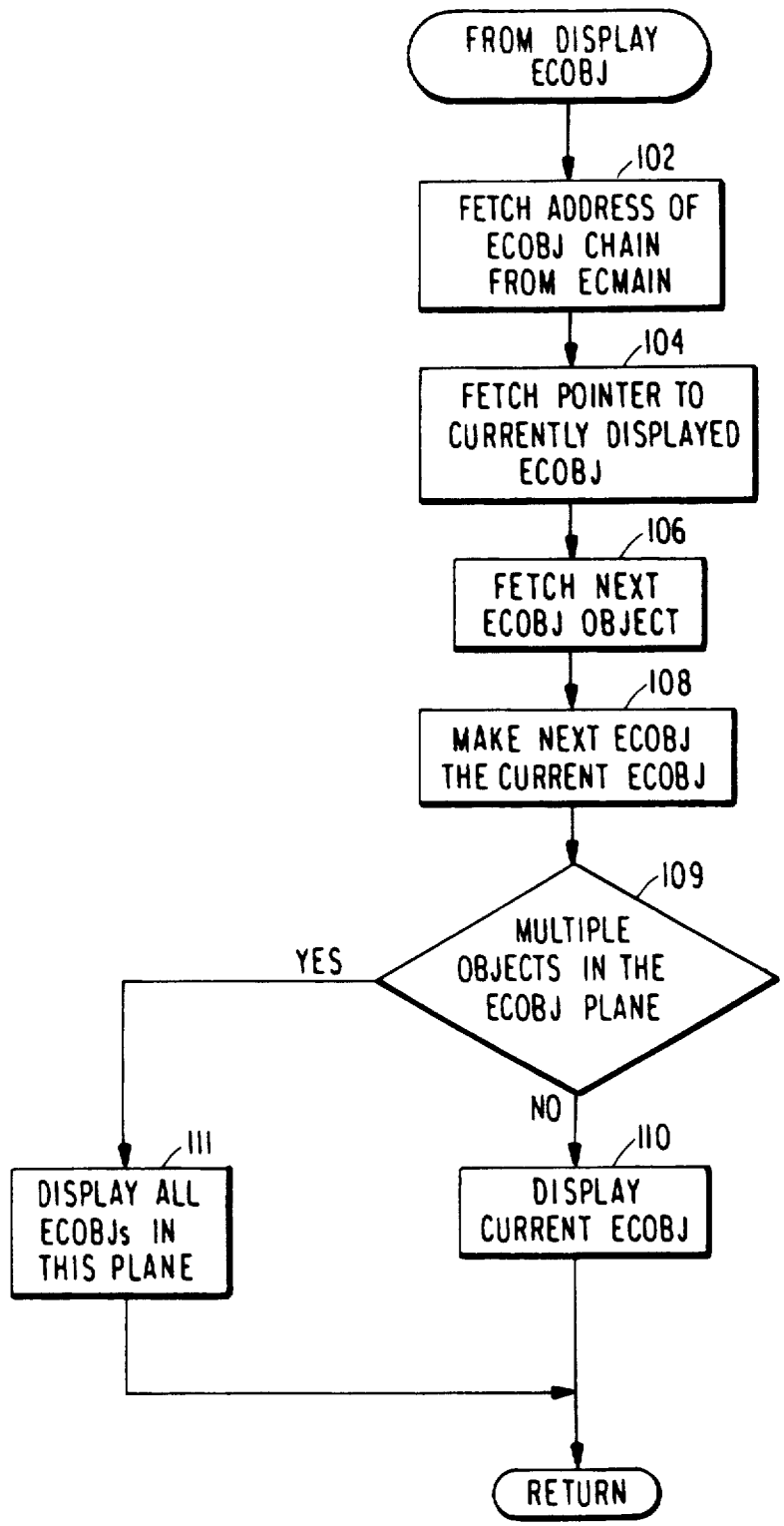
FIG. 11 is a flow diagram of the activate object request logic for exploding cursor objects.

Returning now to decision block 72, if the user has released the input button, a test is next made in decision block 82 to determine if the next EC object has been displayed. If so, the system exits, but if not, a test is next made in decision block 84 to determine if the user's selection is a double click. Here, the double click could be on either mouse button (left or right). If on the left button, the input is interpreted to mean traverse forward, but if on the right button, traverse backward. If not a double click, the object request is activated in function block 86 and the top of next EC object window is opened before the system exits. It will be noted that the calls made in function blocks 78 and 86 are identical. The logic of the function call activate object request is shown in FIG. 11, described hereinbelow.

Going back to decision block 84, if a double click is detected, this by the convention of the preferred embodiment of the invention is a possible request for a passive object. In function block 88, the application program must make an EC call, and then in function block 90, a message is sent to the current application that a passive EC object selection has been made. The logic shown in FIG. 10B is a message from the system to the application program notifying the application that it has to open a window. The user does not get involved.

Control next goes to FIG. 10C where a test is made in decision block 92 to determine if the incoming message is a passive EC object selection. If not, an input click is processed in function block 94 for application processing before exiting to the application. On the other hand, if the incoming message is a passive EC object selection, then a window is created for the selected data in function block 96. The data is sent to the window in function block 98, and the new window is displayed in function block 100 before the system exits. The logic just described in FIG. 10C must be coded by the application programs which intend to use the exploding cursor function. In other words, this is application enabling logic.

Returning briefly to FIG. 10B, calls are made at function blocks 78 and 86 to the activate object request function. This function is shown in the flow diagram of FIG. 11. When the function is called, the address of the EC object is fetched from the ECMAIN in function block 102. Next, in function block 104, the pointer to the currently displayed EC object is fetched, and finally the next EC object is fetched in function block 106. The next EC object is made the current EC object in function block 108, and a test is made in decision block 109 to determine if multiple ECOBJs are in the plane. If not, the current EC object is displayed in function block 110 before a return is made to the main program. However, if there are multiple objects in the ECOBJ plane, all ECOBJs in the plane are displayed. This is illustrated, for example by FIG. 5. This routine assumes the display of succeeding ECOBJs. The logic for display of previous ECOBJs is the same, but in reverse order. The direction of chain traversal is dependent on the parameter (next/pre) that was set depending on which mouse button was double clicked.

FIG. 12 is a block diagram illustrating the data structure of chained ECOBJs. The two conditions of a single ECOBJ in a plane and multiple ECOBJs in a plane are illustrated. It will be recalled that the chaining of the ECOBJs is performed by the asynchronous hook function which started when the EC function is first activated.

While the invention has been particularly shown and described with respect to a single preferred embodiment thereof, it will be understood by those skilled in the art that changes can be made in form and detail without departing from the scope and spirit of the appended claims.

Having thus described my invention, what I claim as new and desire to secure by Letters Patent is as follows:

1. An interactive method for navigating between windows of at least one computer application program installed on a computer system, said method comprising the steps of:

monitoring a user input to determine if an exploding cursor function has been activated; and linking said windows in an arbitrary sequence to form a chain of windows when said exploding cursor function has been activated, said windows being identified by a file stored in said computer system and ordered in the file in a sequence according to an order in which the windows were activated in a computer session.

2. The interactive method recited in claim 1 further comprising the step of accessing said file and opening a window on a display screen of said computer system to display data objects of a preceding or succeeding window in said chain.

3. The interactive method recited in claim 2 further including accessing data from an application program displayed in a window on the display screen comprising the steps of:
   monitoring a user input to determine if a data object has been selected in the displayed window; and
   displaying a file corresponding to the selected data object on the computer screen.

4. The interactive method recited in claim 2 further comprising prior to said accessing step the step of monitoring a user input to determine if an exploding cursor has been selected.

5. The interactive method recited in claim 4 wherein the steps of activating and selecting the exploding cursor function is performed by means of a pointing cursor by first positioning the cursor over an exploding cursor icon on the computer display screen and selecting the icon to activate the exploding cursor function and then placing the pointing cursor in a field of a displayed window and selecting the field.

6. The interactive method recited in claim 1 further comprising the steps of:
   determining whether a chain of windows is resident in the computer system; and
   creating a chain of windows if no such chain exists.

7. The interactive method recited in claim 1 further comprising the steps of:
   determining whether a chain of windows is resident in the computer system; and
   adding a window to a pre-existing chain of such windows.

8. The interactive method recited in claim 1 further comprising the steps of:
   determining whether a chain of windows is resident in the computer system; and
   deleting a window from a pre-existing chain of such windows.

9. The interactive method recited in claim 1 wherein said computer system is running a multi-tasking system and at least some of said windows display different computer application programs installed on said computer.

* * * * *